(12) United States Patent
Liu et al.

(10) Patent No.: US 12,335,657 B2
(45) Date of Patent: Jun. 17, 2025

(54) METHOD FOR PROCESSING VIDEO WITH DYNAMIC VIDEO-BASED SUPER-RESOLUTION NETWORK AND CIRCUIT SYSTEM

(71) Applicant: REALTEK SEMICONDUCTOR CORP., Hsinchu (TW)

(72) Inventors: Kang-Yu Liu, Hsinchu (TW); Chon-Hou Sio, Hsinchu (TW); Chia-Wei Yu, Hsinchu (TW); Hao-Ran Wang, Changsha (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 88 days.

(21) Appl. No.: 18/387,094

(22) Filed: Nov. 6, 2023

(65) Prior Publication Data
US 2024/0155070 A1    May 9, 2024

(30) Foreign Application Priority Data
Nov. 8, 2022  (CN) .......................... 202211392990.9

(51) Int. Cl.
*H04N 7/01*    (2006.01)
*G06T 3/40*    (2024.01)
(Continued)

(52) U.S. Cl.
CPC ......... *H04N 7/0117* (2013.01); *G06T 3/4053* (2013.01); *G06T 7/0002* (2013.01); *G06V 10/44* (2022.01); *G06T 2207/30168* (2013.01)

(58) Field of Classification Search
CPC .................... H04N 7/01; H04N 7/0117; G06T 2207/30168; G06T 3/4053; G06T 3/4046; G06T 7/0002; G06V 10/44
(Continued)

(56) References Cited

U.S. PATENT DOCUMENTS

2022/0262079 A1* 8/2022 Croxford ................. G06T 15/20
2023/0196585 A1* 6/2023 Nachum .................... G06T 3/40
382/103

FOREIGN PATENT DOCUMENTS

CN        111539948 A    8/2020
CN        111784693 A    10/2020

OTHER PUBLICATIONS

Zhengqiang Xiong, Manhui Lin, Zhen Lin, Tao Sun, Guangyi Yang, Zhengxing Wang, "Single image super-resolution via Image Quality Assessment-Guided Deep Learning Network", PLoS One, 15(10): e0241313., Oct. 29, 2020 (Oct. 29, 2020), https://doi.org/10.1371/journa l.pone.0241313, Section 3.3, pp. 1-21.

* cited by examiner

*Primary Examiner* — Sherrie Hsia
(74) *Attorney, Agent, or Firm* — Li & Cai Intellectual Property (USA) Office

(57) ABSTRACT

A method for processing a video with a dynamic video-based super-resolution network and a circuit system are provided. In the method, quality scores used to assess a quality of an input video are calculated based on image features of the input video. A moving average algorithm is performed on the quality scores of multiple frames of the input video for obtaining a moving average score. Two corresponding weight tables are selected according to the moving average score. The two weight tables are used to calculate a blending weight that is applied to a neural network super-resolution algorithm. The blending weight is applied to the neural network super-resolution algorithm, so as to produce an output video.

16 Claims, 4 Drawing Sheets

(51) Int. Cl.
 *G06T 3/4053* (2024.01)
 *G06T 7/00* (2017.01)
 *G06V 10/44* (2022.01)
(58) Field of Classification Search
 USPC .................................................. 348/441, 459
 See application file for complete search history.

METHOD FOR PROCESSING VIDEO WITH DYNAMIC VIDEO-BASED SUPER-RESOLUTION NETWORK AND CIRCUIT SYSTEM

CROSS-REFERENCE TO RELATED PATENT APPLICATION

This application claims the benefit of priority to China Patent Application No. 202211392990.9, filed on Nov. 8, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a super-resolution calculation technology, and more particularly to a circuit system and a method for processing a video using a blending weight, so as to adapt to a dynamic video-based super-resolution network.

BACKGROUND OF THE DISCLOSURE

Super-resolution imaging (SR) is a technology that enhances a resolution of a video. An image-processing device can enhance a resolution of an image by the super-resolution technology when the resolution is poor. Conventionally, an artificial intelligence (AI) can also be used to enhance capability of the super-resolution technology. The AI-based super-resolution technology is referred to as artificial intelligence super resolution (AISR).

The artificial intelligence super resolution technology adopts a set of well-trained super-resolution parameters of a convolutional neural network (CNN) to establish artificial intelligence super resolution models having multiple magnification ratios. One of the artificial intelligence super resolution models having a specific magnification ratio can be applied to a super-resolution algorithm.

In the conventional artificial intelligence super resolution technology, the artificial intelligence super resolution model is often incorporated in an image chip that is used to process a streaming video. In order to optimize a super-resolution effect, images having different resolutions are provided with different parameter settings.

For example, a 4K player can receive different video qualities, such as a 4K video, a 2K video, a 720p video or a 480p video. In the conventional artificial intelligence super resolution technology, different artificial intelligence parameters can be applied to the video based on the resolution of the video. In order to optimize the super-resolution effect, different parameter settings are provided for videos having different resolutions. The parameters can be weights applied to an algorithm that is used to process the video.

FIG. 1 is a diagram of a conventional system framework that achieves super-resolution (SR) imaging through a neural network technology.

In the diagram, a video device that adopts a neural network super-resolution technology receives an input video 11. Based on information in data packets of the input video 11, an image quality assessment (IQA) unit 13 determines attributes of the video, such as the resolution of the video. The algorithm can be used to calculate quality scores that are relevant to an image quality of the video. A video assessment score table 14 is further incorporated to assess whether the resolution of the video is 4K, 2K, 720p or 480p.

For example, the quality scores of the video that are calculated by the image quality assessment unit 13 range from 0 to 255. The video assessment score table 14 records the quality scores for various resolutions. The quality score can be 0 for the 4K video, 85 for the 2K video, 170 for the 720p video and 255 for the 488p video, so that a resolution of the input video 11 can be assessed. After the resolution of the input video 11 is obtained, a weight used for a neural network calculation can be retrieved from a memory by a decision of a selector 15. In the present example, the memory stores four parameters of a neural network super-resolution algorithm. As shown in the diagram, the parameters can be a 4K resolution weight 101, a 2K resolution weight 102, a 720p resolution weight 103, and a 480p resolution weight 104.

After a comparison is made with the resolution of the input video 11 to be assessed, the selector 15 is used to obtain a corresponding weight. The weight is outputted to a neural network super-resolution (NNSR) unit 16, and the weight is applied to the neural network super-resolution algorithm Through one magnification ratio in the neural network super-resolution algorithm, the input video 11 with lower resolution images is magnified to an output video 12 with higher resolution images.

In the conventional neural network super-resolution technology, when a streaming video is being processed, an assessment result of the video is required in real time for calculation of neural network super-resolution. During operation of the image quality assessment unit 13, the assessed quality scores of the video can be referred to for instantly switching among different resolutions, such that resolution weights recorded in the memory are frequently switched. When the output video 12 is generated by applying different resolution weights to the neural network super-resolution unit 16, the smoothness of playing the output video 12 may be affected.

SUMMARY OF THE DISCLOSURE

In response to the above-referenced technical inadequacies of a conventional super-resolution technology (in which a neural network super-resolution algorithm is performed with several resolution weights written in a memory), the present disclosure provides a method for processing a video with a dynamic video-based super-resolution network and a circuit system.

In the circuit system, a processor is used to perform image quality assessment and calculation of a blending weight, and a memory is used to store a lookup table that records multiple weight tables corresponding to multiple video qualities. In the method that is operated in the circuit system, a quality of an input video is assessed according to image features of the input video, and this includes continuously calculating quality scores of multiple frames of the input video. The quality scores are used to assess the quality of the input video. Afterwards, a moving average algorithm is performed on the quality scores of the multiple frames, so as to obtain a moving average score. According to the moving average score, two corresponding weight tables in the lookup table can be selected for calculating a blending weight applied to the neural network super-resolution algorithm. The blending weight can be applied to the neural network super-resolution algorithm for producing an output video.

Preferably, in the method, a neural network model is incorporated to calculate the quality scores of the multiple frames in the continuous frames of the input video.

Further, the quality of the input video to be assessed based on the quality scores includes a resolution and image noises of the input video.

Still further, the lookup table records multiple intervals of the moving average score, and each of the intervals corresponds to a first parameter and a second parameter that respectively indicate the two weight tables corresponding to different video qualities.

Further, in the step of calculating the blending weight applied to the neural network super-resolution algorithm, the interval in which the moving average score lies corresponds to the first parameter and the second parameter, and the blending weight is calculated according to a blending ratio between the first parameter and the second parameter. The blending ratio is used to adjust a weight between the resolution indicated by the first parameter and another resolution indicated by the second parameter.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
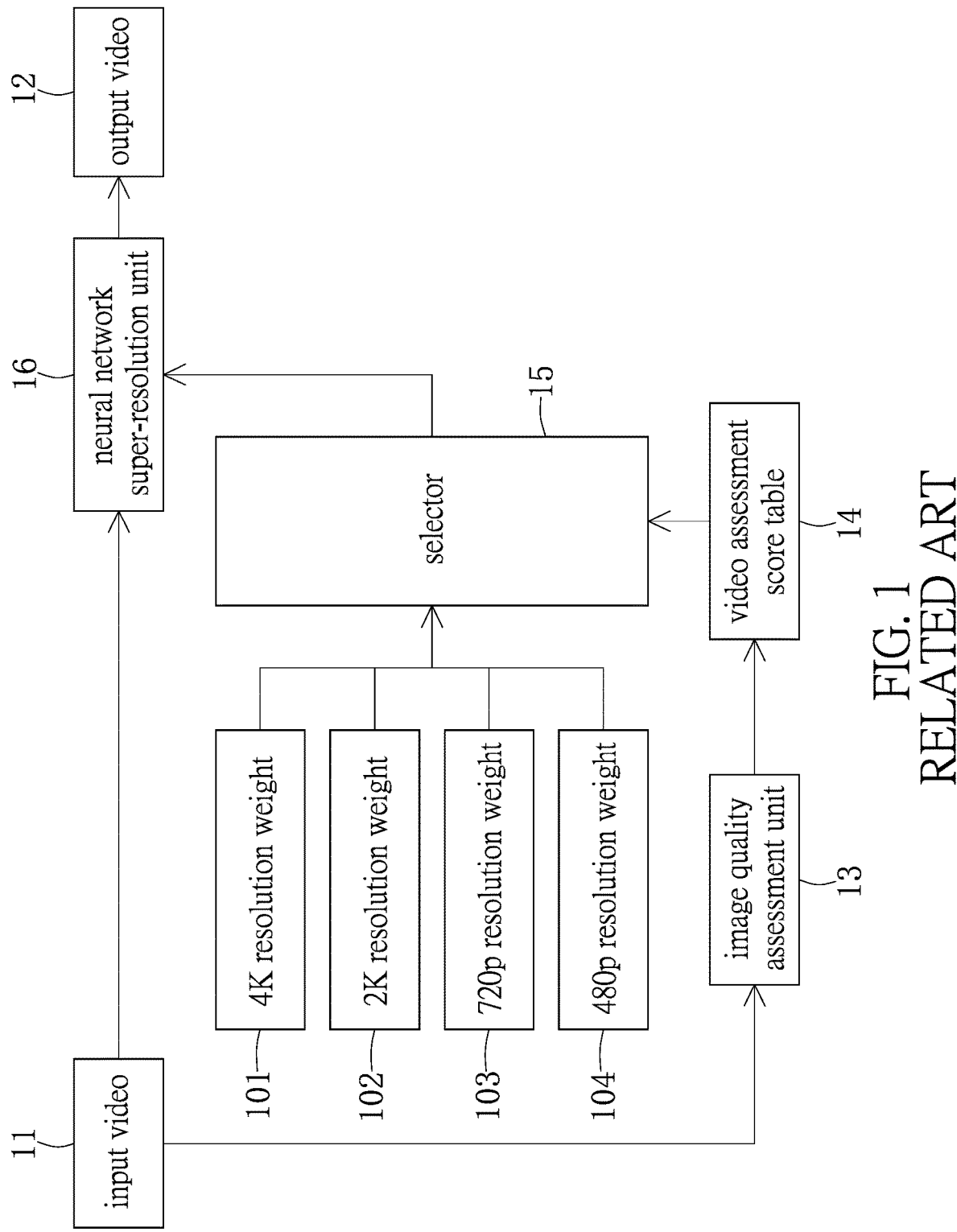
FIG. 1 is a schematic diagram of a conventional system framework that achieves super-resolution imaging through a neural network technology.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a method for processing a video with a dynamic video-based super-resolution network and a circuit system. The method relates to an image processing technology that incorporates a dynamic neural network super-resolution algorithm. The circuit system achieves a technology of combining image quality assessment and dynamic calculation by means of hardware or with software. Weights that are determined based on image quality scores can be continuously applied to the neural network super-resolution algorithm, and the image quality scores are calculated by a neural network model. Accordingly, the super-resolution processed video can be played smoothly even if the video is switched among different image qualities.

In one embodiment of the circuit system that performs the method, a dynamic neural network super-resolution solution is provided for allowing the video to be smoothly switched among different image qualities. One aspect of the method is to introduce weight blending and score mapping into the image quality assessment and the neural network super-resolution algorithm Reference is made to FIG. 2, which shows a system framework of the circuit system.

Figure 2:
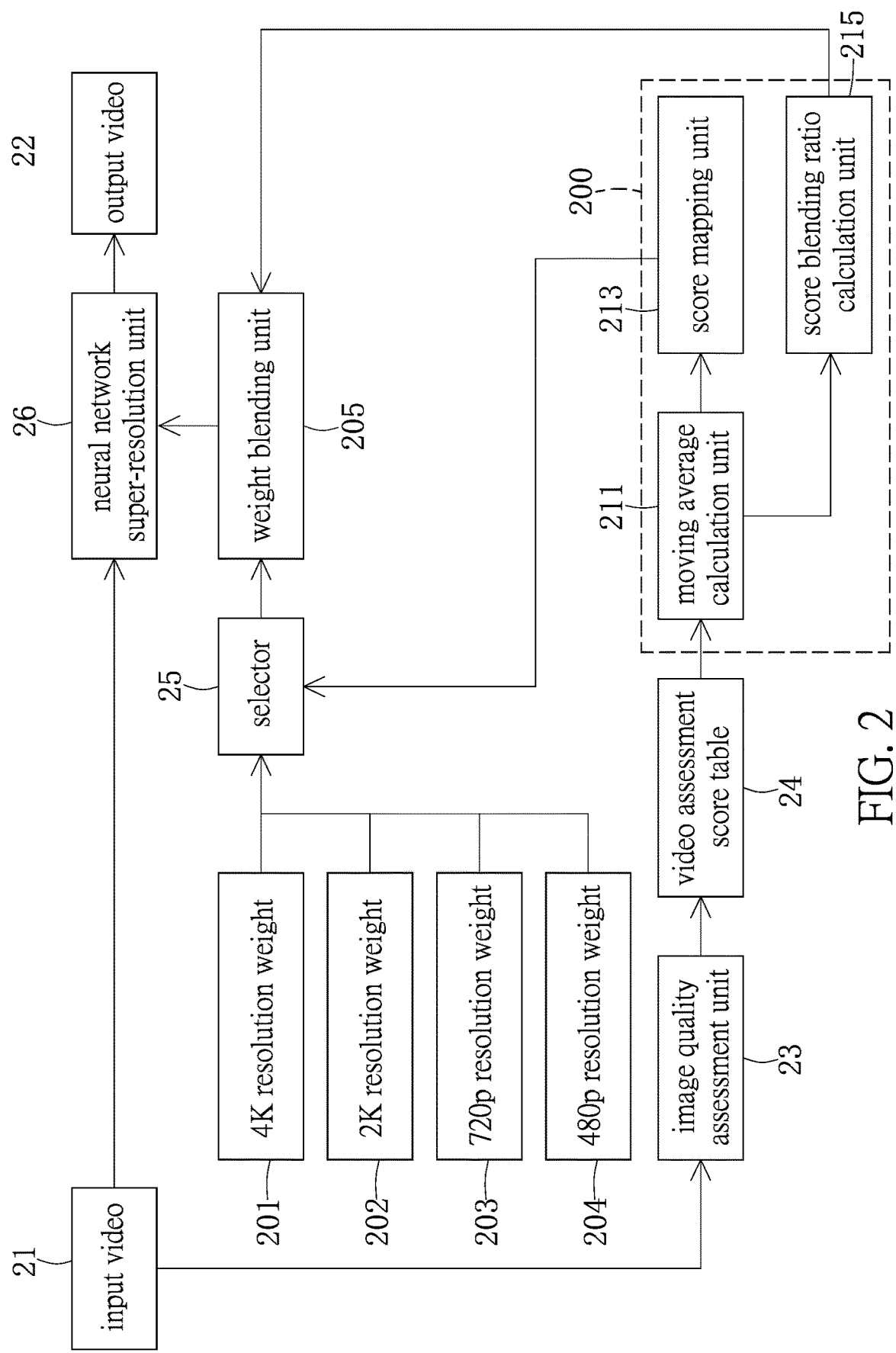
FIG. 2 is a schematic diagram illustrating a framework of a circuit system that performs a method for processing a video with a dynamic video-based super-resolution network according to one embodiment of the present disclosure.

According to one of the embodiments of the present disclosure, the circuit system shown in FIG. 2 can be a system-on-chip (SoC), and can be applied to a video device such as a set top box (STB) or a television. The system framework of the circuit system essentially includes a processor, a memory, an input/output circuit, a selector that can be implemented by a multiplexer, and other relevant circuits. The various circuit components are electrically interconnected with each other. In the diagram, an image quality assessment unit 23, a score processing unit 200 that is used to calculate a blending weight, and a neural network super-resolution unit 26 can all be implemented in a hardware manner by a neural network (CNN) framework. The processor is primarily used to perform the image quality assessment and calculate the blending weight. The memory records multiple weight tables corresponding to multiple video qualities. Through a circuitry, the selector is used to select one or more weight tables recorded in the memory.

Figure 3:
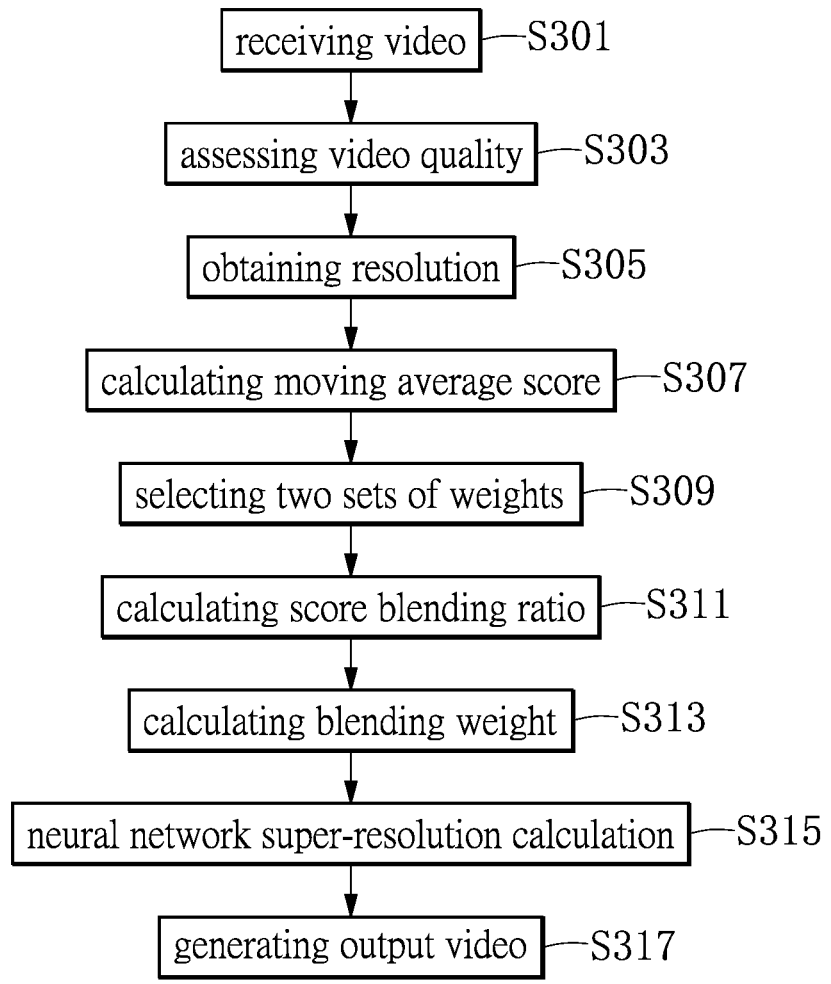
FIG. 3 is a flowchart illustrating the method for processing the video with the dynamic video-based super-resolution network according to one embodiment of the present disclosure.

Reference is further made to FIG. 3, which is a flowchart illustrating the method for processing the video with the dynamic video-based super-resolution network operated in the circuit system according to one embodiment of the present disclosure.

Firstly, the circuit system receives an input video 21 (step S301). The image quality assessment unit 23 is used to extract image features of the input video 21, so as to assess a quality of the input video 21. In detail, the image quality assessment unit 23 can determine features of the video based on packet information of the input video 21, or use the neural network model to assess a quality score of the video. For example, quality scores of multiple frames of the video can be continuously calculated, and a specific quality score can be calculated from the multiple frames of the video after sampling (step S303). Next, when compared with a video assessment score table 24, a resolution of the video can be assessed (step S305). For example, the resolution of the video can be 4K resolution, 2K resolution, 720p resolution or 480p resolution. In addition to using the resolution to denote the video quality, the video quality can also be assessed by image noises. A well-trained neural network model can be used to assess the video quality based on the noises in the images.

According to one embodiment of the present disclosure, when the circuit system performs the image quality assessment, a deep neural network based (DNN-based) image quality assessment is used. When the neural network model is being trained, multiple convolution layers and multiple pooling layers are used to extract the features of the video. Afterwards, a regression is processed through one or more fully-connected layers, so as to form an image quality assessment model that is used to calculate a quality score used for assessing the resolution of the video.

According to one embodiment of the present disclosure, the quality score calculated by the image quality assessment unit 23 ranges from 0 to 255. The video assessment score table 24 records multiple quality scores of multiple video resolutions. In an exemplary example, the memory stores a table (such as Table One) that records the quality scores corresponding to the multiple video resolutions (e.g., 0 for 4K resolution, 85 for 2K resolution, 170 for 720p resolution, and 255 for 488p resolution). Accordingly, the resolution of the input video 21 can be assessed according to the quality score, and the resolution corresponds to a weight table in which the neural network super-resolution algorithm is operated.

TABLE ONE

| resolution | quality score (0 to 255) |
|---|---|
| 4K | 0 |
| 2K | 85 |
| 720p | 170 |
| 480p | 255 |

However, when the packet information is referred to for determining the features of the video, or the image quality assessment model is used to assess the resolution of the video, the assessment may be inaccurate or the quality score may be on a boundary. Specifically, if the quality score is near the boundary, the weight table of the neural network super-resolution may be frequently switched, and a picture may also become unstable after application of the neural network super-resolution algorithm. Accordingly, before the weight applied to the neural network super-resolution algorithm is determined based on the resolution of the input video 21, the circuit system of the present disclosure uses a score processing unit 200 to perform a moving average algorithm on the quality scores of the multiple frames obtained by the image quality assessment unit 200. It should be noted that the score processing unit 200 is implemented by a processor that can be a simple processor or implemented by a software program. One of the objectives of the present disclosure is to ensure that the quality scores obtained by the image quality assessment unit 23 are continuous when being applied to the weights of the neural network super-resolution unit 26 that are selected based on the resolution of the video. The moving average indicates an algorithm that is used to determine data points according to a series of averages of multiple numerical values, so as to eliminate short-term changes. For example, a picture quality may change due to an insufficient bandwidth or an unstable source. The moving average algorithm relies on changes of the weights to smoothly output the pictures, such that an issue where the picture to be displayed cannot smoothly transition when switching among different picture qualities can be effectively prevented.

According to one of the embodiments, when calculating a moving average, multiple quality scores of multiple frames can be obtained at once, and the time to retrieve the frame can also be considered. The frame closer to the current frame can be assigned with a higher weight, and the frame farther from the current frame can be assigned with a lower weight. Accordingly, a moving average of the multiple frames can be calculated.

In terms of function, the score processing unit 200 in the present embodiment includes a moving average calculation unit 211, a score mapping unit 213, and a score blending ratio calculation unit 215 that can be implemented by software or hardware. The moving average calculation unit 211 performs the moving average algorithm for collecting quality scores of multiple frames calculated by the image quality assessment unit 23, so as to obtain a moving average score (step S307). Then, the score mapping unit 213 decides a weight that is applied to the neural network super-resolution unit 26 according to the moving average score. In the present embodiment, a weight table used for the neural network super-resolution algorithm is retrieved from the memory through a selector 25 (step S309). That is, the weight table records parameters adopted by a convolutional neural network (CNN) in the hardware. The memory stores multiple weight tables having the weights that are obtained in response to different video qualities through a deep learning algorithm According to one embodiment of the present disclosure, when selecting the weight table used in the neural network super-resolution unit 26, two close weight tables can first be selected from the multiple weight tables stored in the memory according to the moving average score, and then the weights applied to the neural network super-resolution algorithm can be calculated by a weight calculation formula (e.g., Equation 1).

Regarding the selection of the weights, reference can be made to the lookup table stored in the memory. The lookup table records multiple intervals of multiple moving average scores. Each of the intervals corresponds to a pair of a first parameter and a second parameter that respectively indicate the two weight tables corresponding to different video qualities. An example of the lookup table is Table Two, and values listed therein are merely examples and can be expressed by other values in practical use. Table Two shows a comparative relationship of two corresponding parameters (i.e., parameter A and parameter B) within every interval where the moving average score lies. Each of the parameters indicates a specific video quality. The values shown in Table Two are provided for illustrative purposes only, and are not meant to limit the practical use.

TABLE TWO

| moving average score | parameter A | parameter B |
|---|---|---|
| 0 to 84 | weight table 0 (4K resolution weight) | weight table 1 (2K resolution weight) |
| 85 to 169 | weight table 1 (2K resolution weight) | weight table 2 (720p resolution weight) |
| 170 to 255 | weight table 2 (720p resolution weight) | weight table 3 (480p resolution weight) |

According to the examples shown in Table Two, if the moving average score obtained by the moving average calculation unit 211 is between 0 and 84, the corresponding parameter A is weight table 0 (i.e., 4K resolution weight 201), and the corresponding parameter B is weight table 1 (i.e., 2K resolution weight 202). Further, if the moving average score is between 85 and 169, the corresponding parameter A is weight table 1 (i.e., 2K resolution weight 202), and the corresponding parameter B is weight table 2 (i.e., 720p resolution weight 203). If the moving average score is between 170 and 255, the corresponding parameter A is weight table 2 (i.e., 720p resolution weight 203), and the corresponding parameter B is weight table 3 (i.e., 480p resolution weight 204).

In step S309, referring to Table Two, the calculation performed by the score mapping unit 213 in one embodiment of the present disclosure is to select two close weight tables according to the moving average score. Correspondingly, the score blending ratio calculation unit 215 uses the moving average score to generate a blending ratio ($\alpha$) (step S311). The blending ratio ($\alpha$) is a value between 0 and 1, and can be a ratio between the first parameter (i.e., parameter A) and the second parameter (i.e., parameter B). Next, the first parameter, the second parameter, and the blending ratio ($\alpha$) that are obtained from Table Two can be inputted to the weight blending unit 205, so as to calculate a blending weight (step S313). The blending weight is provided to the neural network super-resolution unit 26 and then applied to the neural network super-resolution algorithm for performing neural network super-resolution (step S315). The input video 21 can be magnified to a video with a larger resolution by a magnification ratio, so that an output video 22 is produced (step S317).

Figure 4:
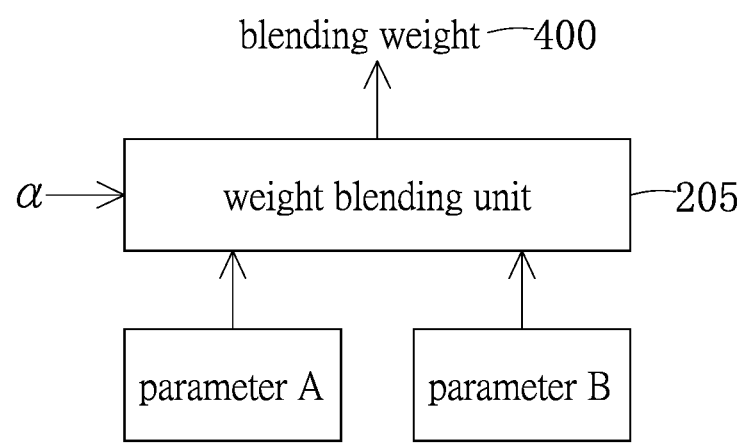
FIG. 4 is a diagram of a calculation unit for calculating a blending weight according to one embodiment of the present disclosure.

Regarding the weight blending unit 205, reference can be made to FIG. 4. FIG. 4 is a diagram of a calculation unit for calculating a blending weight according to one embodiment of the present disclosure. The weight blending unit 205 shown in FIG. 4 can be implemented by a circuitry, a firmware or software. A calculation formula adopted in the weight blending unit 205 can be expressed by Equation 1 below.

$$\text{Param}_{NNSR} = \alpha * \text{Param}_A + (1-\alpha) * \text{Param}_B. \quad \text{Equation 1}$$

Specifically, reference can also be made to the circuit system as shown in FIG. 2. When the image quality assessment unit 23 obtains a quality score of a video, the moving average calculation unit 211 calculates a moving average score. According to the weight tables shown in Table Two and the interval in which the moving average score lies (from 0 to 84, from 85 to 169, or from 170 to 255), the score mapping unit 213 can obtain a parameter A ($\text{Param}_A$) and a parameter B ($\text{Param}_B$) of Equation 1. According to the moving average score, the score blending ratio calculation unit 215 generates a blending ratio ($\alpha$) of Equation 1, and the blending ratio ($\alpha$) ranges from 0 to 1. The blending ratio ($\alpha$) is used to adjust a weight between two resolutions (i.e., a resolution indicated by a first parameter and a resolution indicated by a second parameter). This weight can be used to improve a situation where smoothness of the video to be played is affected by applying different weights to the neural network super-resolution unit 26 (due to an instant change of the resolution of the video). As shown in Table Two, when the moving average score falls between 0 and 84, the blending ratio ($\alpha$) is decided based on whether the moving average score is biased towards 0 or biased towards 84. For example, if the moving average score is biased towards 0, a proportion of the parameter A (4K resolution weight) is indicated to be higher than a proportion of the parameter B (2K resolution weight), and the blending ratio ($\alpha$) is chosen as a value close to 1 according to Equation 1. Conversely, if the moving average score is biased towards 84, the parameter B is indicated to have a higher proportion, and the blending ratio ($\alpha$) is chosen as a value close to 0.

After the first parameter, the second parameter, and the blending ratio are obtained, Equation 1 is further used to calculate a blending weight 400. The blending weight 400 can be used as a neural network super-resolution parameter ($\text{Param}_{NNSR}$) provided to the neural network super-resolution unit 26 for performing the neural network super-resolution algorithm.

It should be noted that, when performing the neural network super-resolution, the neural network super-resolution algorithm requires a large amount of continuously-inputted weights. The weight blending unit 205 calculates a blending parameter by sequentially introducing the parameter A ($\text{Param}_A$), the parameter B ($\text{Param}_B$) and the blending ratio ($\alpha$) into Equation 1. The blending parameter is the neural network super-resolution parameter ($\text{Param}_{NNSR}$) that is configured to be applied to the neural network super-resolution unit 26.

In the circuit system that operates the method for processing the video with the dynamic video-based super-resolution network of the present disclosure, one of the reasons for using the blending weight is that an image processing chip is generally required to process a streaming video in real time. However, if the video device does not have a powerful processor, it is difficult to achieve the real-time calculation (e.g., performing calculation of neural network super-resolution with a large amount of weights in milliseconds). Thus, the circuit system of the present disclosure uses a circuitry for a weight blending operation (i.e., the weight blending unit 205) to generate the blending weight, and can directly output the blending weight to a circuit performing the neural network super-resolution algorithm A bandwidth that is used to transmit the blending weight to the circuit via the memory can be reduced. Through this configuration, a simple processor is capable of processing the video with fast and dynamically-switching neural network super-resolution weight tables.

In conclusion, in the method for processing the video with the dynamic video-based super-resolution network and the circuit system provided by the present disclosure, a calculation unit for providing a blending weight is incorporated between an image quality assessment unit and a neural network super-resolution unit. By applying the blending weight to the neural network super-resolution algorithm, an impact caused by applying different weights to the moving average algorithm for assessing the video can be mitigated. In this way, the purposes of running the neural network super-resolution on a simple processor and providing the circuit system adapted to the dynamically-changed neural network super-resolution can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing a video with a dynamic video-based super-resolution network, comprising:
   receiving an input video;
   continuously calculating, according to image features of the input video, quality scores of multiple frames of the input video, so as to assess a quality of the input video;
   performing a moving average algorithm upon the quality scores of the multiple frames, so as to obtain a moving average score;
   selecting, according to the moving average score, two corresponding weight tables for calculating a blending weight applied to a neural network super-resolution algorithm; and
   applying the blending weight to the neural network super-resolution algorithm, so as to produce an output video.

2. The method according to claim 1, wherein a neural network model is incorporated to calculate the quality scores of the multiple frames of the input video, and the multiple frames are continuous frames.

3. The method according to claim 2, wherein the quality of the input video that is assessed based on the quality scores includes a resolution and image noises of the input video.

4. The method according to claim 2, wherein the quality scores are compared with a video assessment score table for obtaining a resolution of each of the frames of the input video.

5. The method according to claim 1, wherein, according to a lookup table, the two weight tables corresponding to the moving average score are obtained; wherein the lookup table records multiple intervals of the moving average score, each of the intervals corresponds to a first parameter and a second parameter, and the first parameter and the second parameter are respectively the two weight tables corresponding to different video qualities.

6. The method according to claim 5, wherein, in the step of calculating the blending weight applied to the neural network super-resolution algorithm, the first parameter and the second parameter that correspond to the interval in which the moving average score lies are obtained, and the blending weight is calculated according to a blending ratio between the first parameter and the second parameter; wherein the blending ratio is used to adjust a weight between a resolution indicated by the first parameter and a resolution indicated by the second parameter.

7. The method according to claim 6, wherein an equation for calculating the blending weight is:

$$\text{Param}_{NNSR} = \alpha \cdot \text{Param}_A + (1-\alpha) \cdot \text{Param}_B;$$

where "$\alpha$" denotes the blending ratio and is a value between 0 and 1, "$\text{Param}_A$" denotes the first parameter, "$\text{Param}_B$" denotes the second parameter, and "$\text{Param}_{NNSR}$" denotes the blending weight and is a weight applied to the neural network super-resolution algorithm.

8. A circuit system, wherein the circuit system operates a method for processing a video with a dynamic video-based super-resolution network, and the circuit system comprises:
   a processor used to perform image quality assessment and calculation of a blending weight; and
   a memory electrically connected to the processor, wherein the memory stores a lookup table, and the lookup table records multiple weight tables corresponding to multiple video qualities;
   wherein the method operated by the circuit system includes:
   receiving an input video;
   continuously calculating, according to image features of the input video, quality scores of multiple frames of the input video so as to assess quality of the input video;
   performing a moving average algorithm upon the quality scores of the multiple frames, so as to obtain a moving average score;
   selecting, according to the moving average score, two corresponding weight tables for calculating the blending weight applied to a neural network super-resolution algorithm; and
   applying the blending weight to the neural network super-resolution algorithm, so as to produce an output video.

9. The circuit system according to claim 8, wherein the circuit system is a system-on-chip disposed in a video device.

10. The circuit system according to claim 8, further comprising a selector, wherein the selector is used to select the two weight tables recorded in the memory.

11. The circuit system according to claim 8, wherein, in the method for processing the video with the dynamic video-based super-resolution network, a neural network model is incorporated to calculate the quality scores of the multiple frames of the input video, and the multiple frames are continuous frames.

12. The circuit system according to claim 11, wherein the quality of the input video that is assessed based on the quality scores includes a resolution and image noises of the input video.

13. The circuit system according to claim 11, wherein the quality scores are compared with a video assessment score table for obtaining a resolution of each of the frames of the input video.

14. The circuit system according to claim 8, wherein, according to the lookup table, the two weight tables corresponding to the moving average score are obtained; wherein the lookup table records multiple intervals of the moving average score, each of the intervals corresponds to a first parameter and a second parameter, and the first parameter and the second parameter are respectively the two weight tables corresponding to different video qualities.

15. The circuit system according to claim 14, wherein, in the step of calculating the blending weight applied to the neural network super-resolution algorithm, the first parameter and the second parameter that correspond to the interval in which the moving average score lies are obtained, and the blending weight is calculated according to a blending ratio between the first parameter and the second parameter; wherein the blending ratio is used to adjust a weight between a resolution indicated by the first parameter and a resolution indicated by the second parameter.

16. The circuit system according to claim 15, wherein an equation for calculating the blending weight is:

$$Param_{NNSR} = \alpha * Param_A + (1-\alpha) * Param_B;$$

where "$\alpha$" denotes the blending ratio and is a value between 0 and 1, "$Param_A$" denotes the first parameter, "$Param_B$" denotes the second parameter, and "$Param_{NNSR}$" denotes the blending weight and is a weight applied to the neural network super-resolution algorithm.

* * * * *